(12) United States Patent
Levy

(10) Patent No.: US 10,175,430 B2
(45) Date of Patent: Jan. 8, 2019

(54) OVERMOULDED FURCATION ASSEMBLY WITH STRAIN RELIEF

(71) Applicant: BELDEN CANADA INC., Saint-Laurent (CA)

(72) Inventor: Moise Levy, Laval (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 15/586,982

(22) Filed: May 4, 2017

(65) Prior Publication Data
US 2017/0322380 A1 Nov. 9, 2017

Related U.S. Application Data

(60) Provisional application No. 62/332,141, filed on May 5, 2016.

(51) Int. Cl.
*G02B 6/38* (2006.01)
*G02B 6/44* (2006.01)

(52) U.S. Cl.
CPC ......... *G02B 6/3885* (2013.01); *G02B 6/3851* (2013.01); *G02B 6/443* (2013.01); *G02B 6/4477* (2013.01)

(58) Field of Classification Search
CPC .. G02B 6/3885; G02B 6/3887; G02B 6/3851; G02B 6/3839; G02B 6/3893; G02B 6/4471
See application file for complete search history.

(56) References Cited

U.S. PATENT DOCUMENTS

| 4,288,107 A | 9/1981 | Schwartze |
| 4,453,291 A | 6/1984 | Fidrych |
| 4,826,277 A | 5/1989 | Weber et al. |
| 4,884,862 A | 12/1989 | Kofod |
| 4,989,945 A | 2/1991 | Ohkura |
| 5,230,034 A * | 7/1993 | Bottoms, Jr. ........ G02B 6/4419 385/100 |
| 5,231,688 A | 7/1993 | Zimmer |
| 5,325,457 A * | 6/1994 | Bottoms, Jr. ........ G02B 6/4419 385/100 |
| 5,480,203 A | 1/1996 | Favalora et al. |
| 5,838,861 A | 11/1998 | Bunde |
| 5,863,083 A | 1/1999 | Giebel |
| 5,903,693 A | 5/1999 | Brown |
| 5,970,195 A | 10/1999 | Brown |
| 6,266,469 B1 | 7/2001 | Roth |

(Continued)

*Primary Examiner* — Akm Enayet Ullah
(74) *Attorney, Agent, or Firm* — Hugh Mansfield

(57) ABSTRACT

An assembly comprises an optic cable comprising a plurality of optic fiber subunits each comprising at least one optic fiber encased in a fiber jacket and a plurality of aramid strands is disclosed. The assembly further comprises one or more blocks comprising a passage ways for receiving the optic fiber subunits and maintaining adjacent ones of the optic fiber subunits at a predetermined spacing. A housing is molded over the open end of the cable jacket, the aramid strands and the first end of the at least one block. A method of overmolding a transition between an optic fiber cable and a furcation jacketing is also disclosed wherein a mold comprises ribs arranged at right angles to an axis of the mold and such that aramid strands are prevented during injecting from reaching a surface of the mold.

9 Claims, 9 Drawing Sheets

(56) References Cited

U.S. PATENT DOCUMENTS

| | | | |
|---|---|---|---|
| 6,278,831 B1 | 8/2001 | Henderson | |
| 6,389,214 B1 | 5/2002 | Smith et al. | |
| 6,396,993 B1 | 5/2002 | Giebel et al. | |
| 6,434,316 B1 | 8/2002 | Grois et al. | |
| 6,438,299 B1 | 8/2002 | Brown et al. | |
| 6,738,555 B1 | 5/2004 | Cooke et al. | |
| 6,764,221 B1 | 7/2004 | Jong et al. | |
| 6,816,663 B2 | 11/2004 | Daoud | |
| 6,993,237 B2 | 1/2006 | Cooke et al. | |
| 7,270,485 B1 | 9/2007 | Robinson et al. | |
| 7,272,282 B1* | 9/2007 | Seddon | G02B 6/4475 385/100 |
| 7,277,614 B2 | 10/2007 | Cody et al. | |
| 7,280,725 B2 | 10/2007 | Brown et al. | |
| 7,461,981 B2 | 12/2008 | Yow et al. | |
| 7,494,284 B2 | 2/2009 | Robinson et al. | |
| 7,703,990 B1 | 4/2010 | De Jong et al. | |
| 7,742,667 B2* | 6/2010 | Paschal | G02B 6/443 385/101 |
| 7,869,685 B2 | 1/2011 | Hendrickson et al. | |
| 7,903,925 B2 | 3/2011 | Cooke et al. | |
| 7,995,004 B2 | 8/2011 | Saiki | |
| 8,155,490 B2 | 4/2012 | De Jong et al. | |
| 8,172,465 B2 | 5/2012 | Kleeberger | |
| 8,221,006 B2 | 7/2012 | Theuerkom | |
| 8,290,321 B2* | 10/2012 | Rhyne | G02B 6/441 385/100 |
| 8,380,029 B2 | 2/2013 | Cline et al. | |
| 8,401,353 B2 | 3/2013 | Barker et al. | |
| 8,571,367 B2 | 10/2013 | Van Der Meulen et al. | |
| 8,573,855 B2 | 11/2013 | Nhep | |
| 8,620,130 B2 | 12/2013 | Cooke et al. | |
| 8,630,523 B2 | 1/2014 | Smith et al. | |
| 8,731,364 B2 | 5/2014 | Murano et al. | |
| 8,831,395 B2 | 9/2014 | Sievers et al. | |
| 8,842,954 B2 | 9/2014 | Burris et al. | |
| 8,917,968 B2 | 12/2014 | Cooke et al. | |
| 8,944,411 B2 | 2/2015 | Cooke et al. | |
| 8,953,916 B2 | 2/2015 | Hurley et al. | |
| 8,958,673 B2 | 2/2015 | Cline et al. | |
| 9,069,152 B2 | 6/2015 | Smith et al. | |
| 9,075,219 B2 | 7/2015 | Blockey et al. | |
| 2002/0141724 A1 | 10/2002 | Ogawa et al. | |
| 2003/0063868 A1 | 4/2003 | Fentress | |
| 2003/0165307 A1 | 9/2003 | Liden | |
| 2003/0210875 A1 | 11/2003 | Wagner et al. | |
| 2005/0111811 A1 | 5/2005 | Cooke et al. | |
| 2006/0280413 A1* | 12/2006 | Paschal | G02B 6/443 385/112 |
| 2008/0138026 A1 | 6/2008 | Yow et al. | |
| 2008/0175548 A1 | 7/2008 | Knecth et al. | |
| 2009/0190889 A1 | 7/2009 | Robinson et al. | |
| 2010/0054678 A1 | 3/2010 | Dimarco | |
| 2010/0092135 A1 | 4/2010 | Barker et al. | |
| 2010/0092136 A1 | 4/2010 | Nhep | |
| 2010/0098386 A1* | 4/2010 | Kleeberger | G02B 6/4472 385/100 |
| 2011/0091169 A1 | 4/2011 | Van Der Meulen et al. | |
| 2011/0243514 A1* | 10/2011 | Nave | G02B 6/4459 385/110 |
| 2012/0230636 A1 | 9/2012 | Blockey et al. | |
| 2012/0328253 A1* | 12/2012 | Hurley | G02B 6/4472 385/103 |
| 2013/0183012 A1 | 7/2013 | Lopez et al. | |
| 2014/0241676 A1 | 8/2014 | Smith | |

* cited by examiner

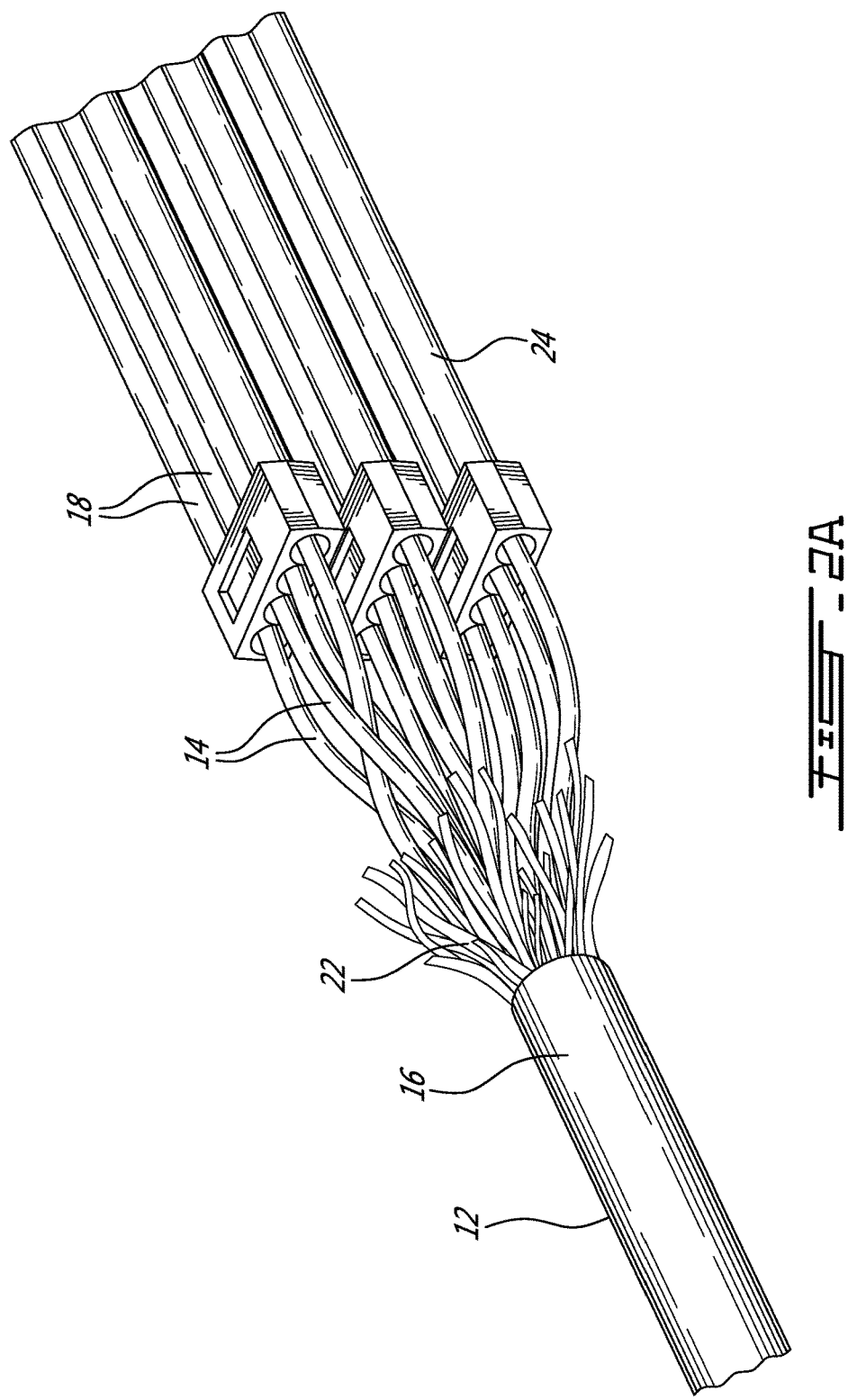

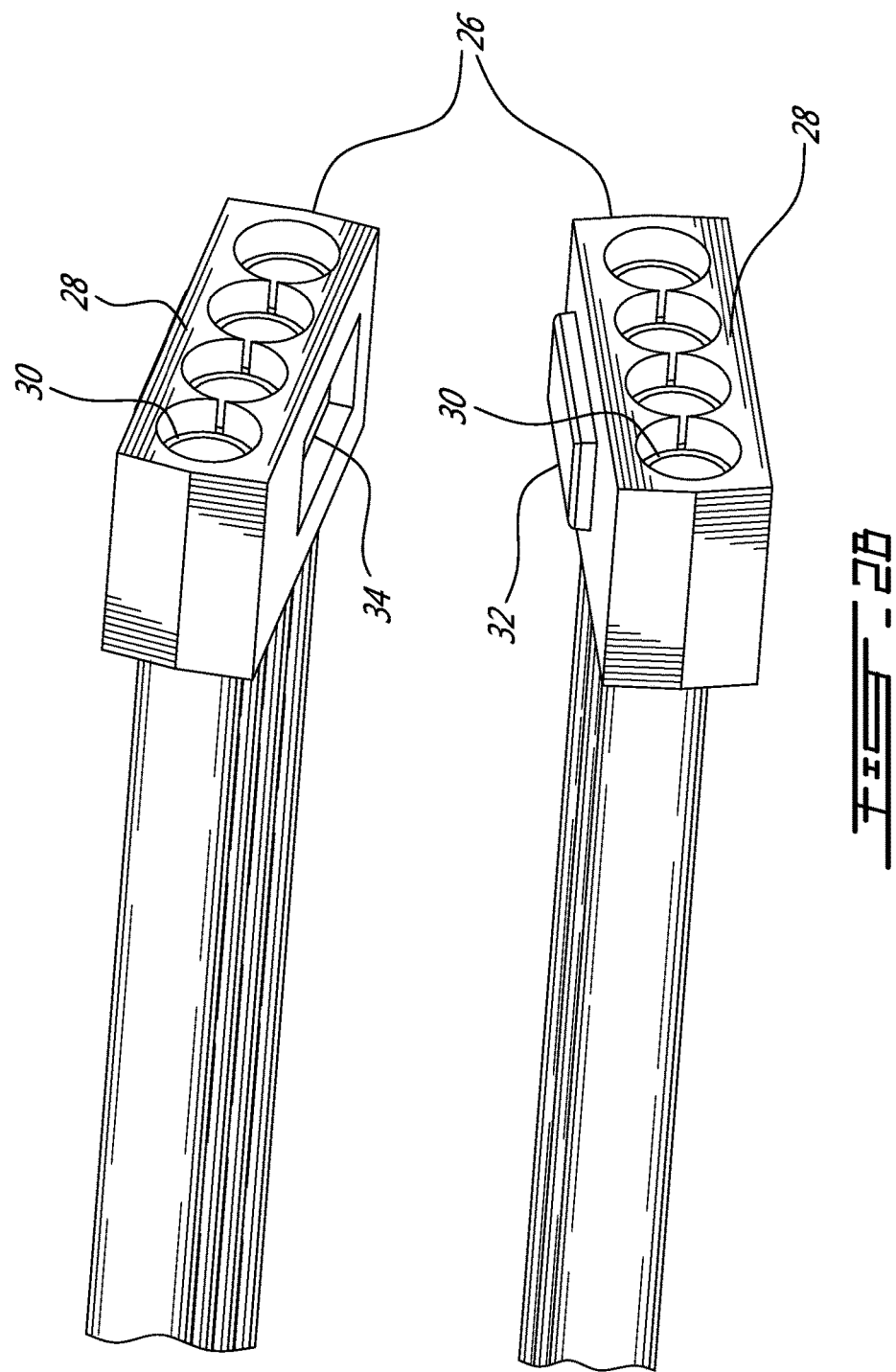

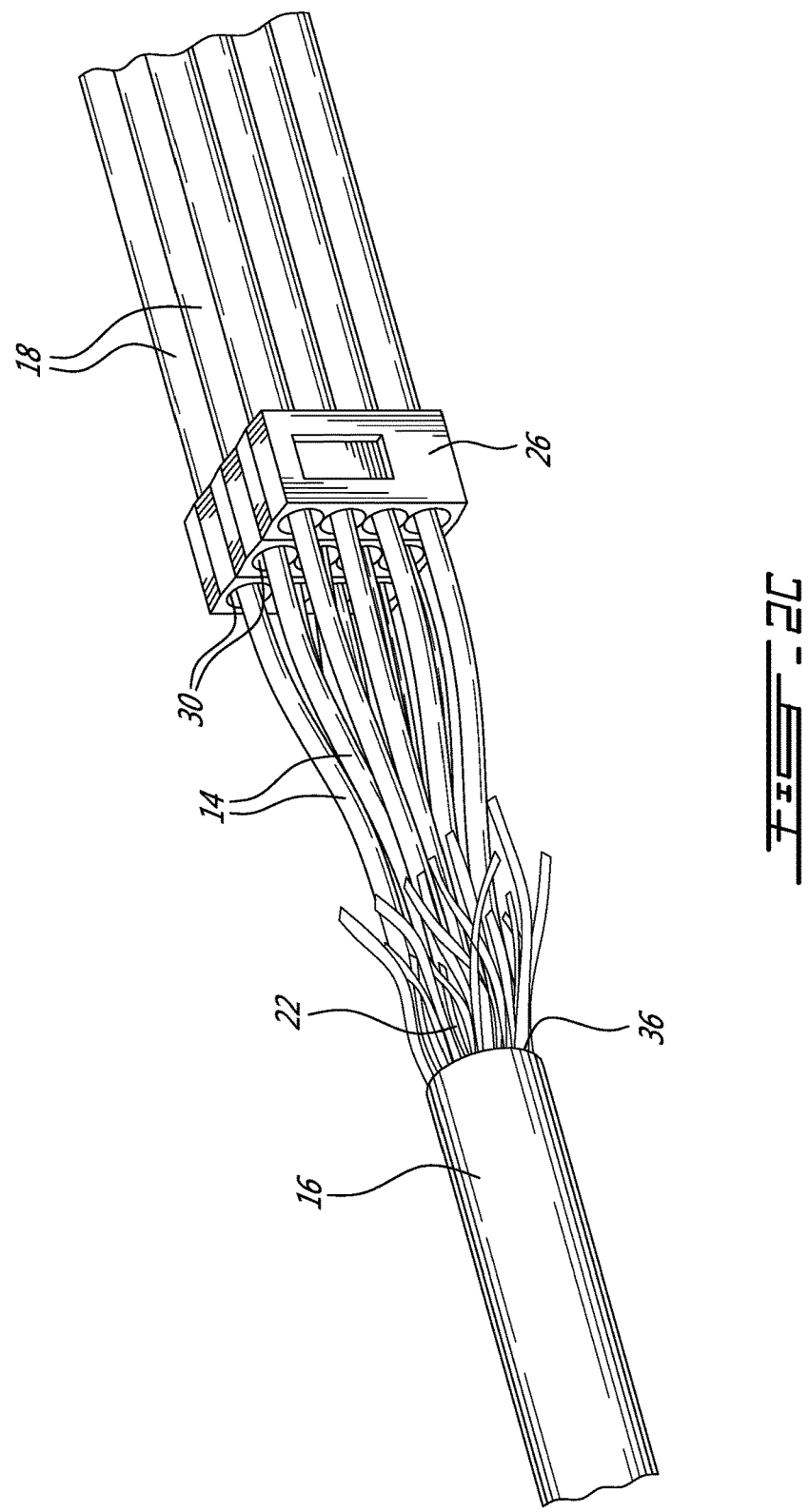

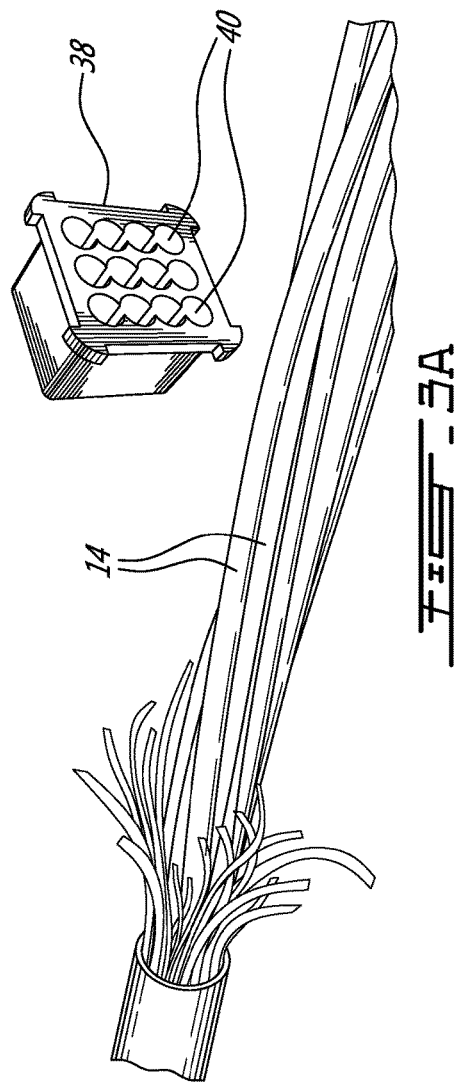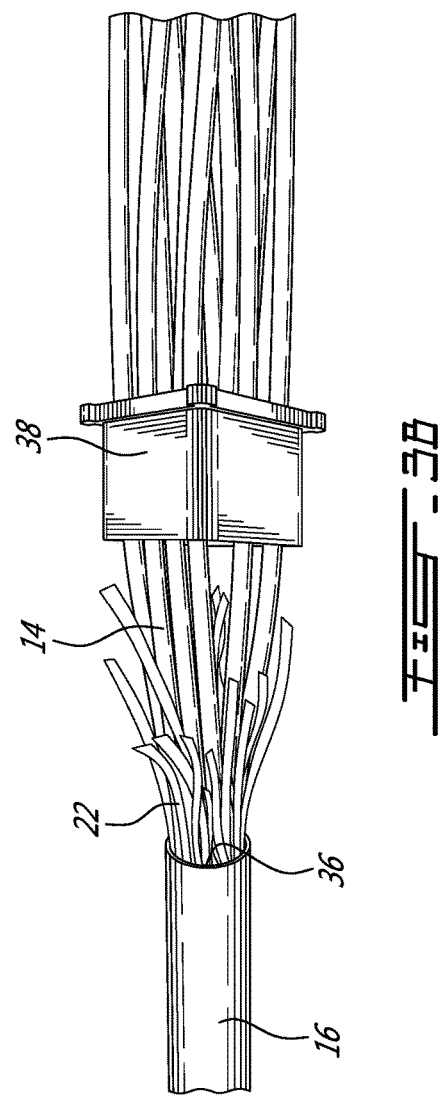
FIG-3A
FIG-3B

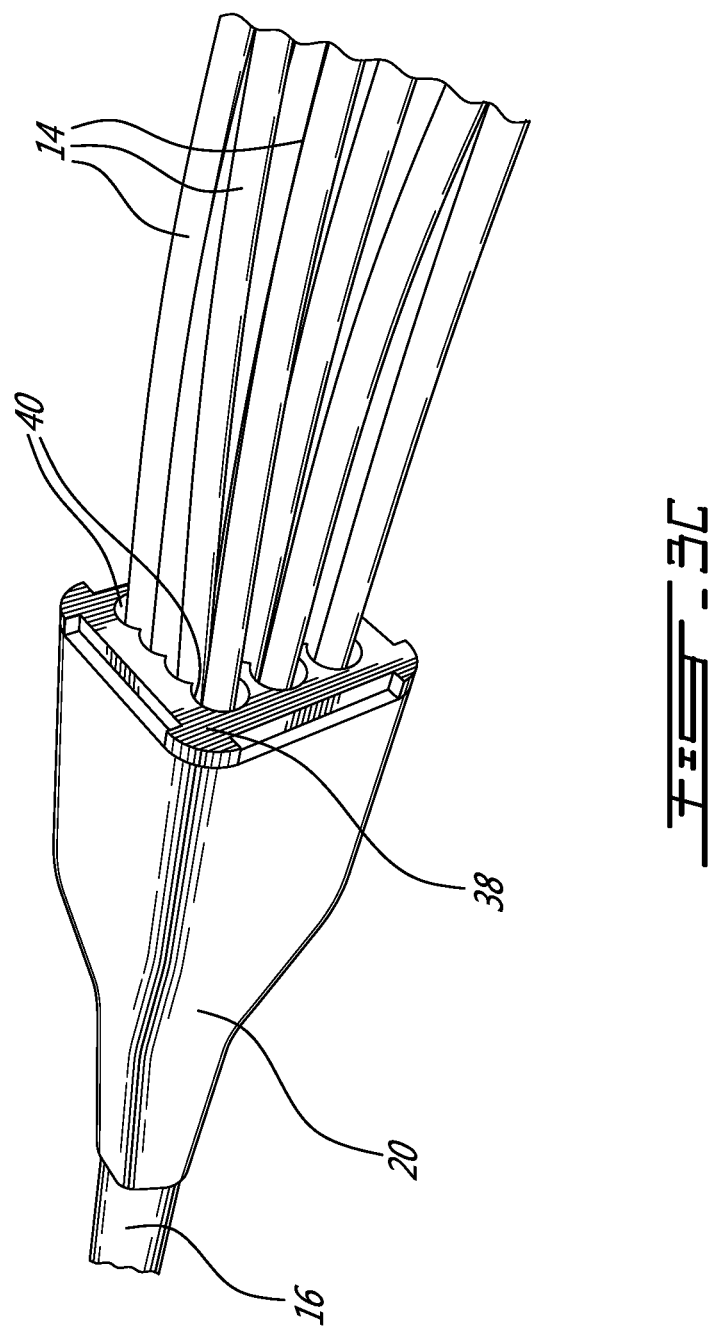

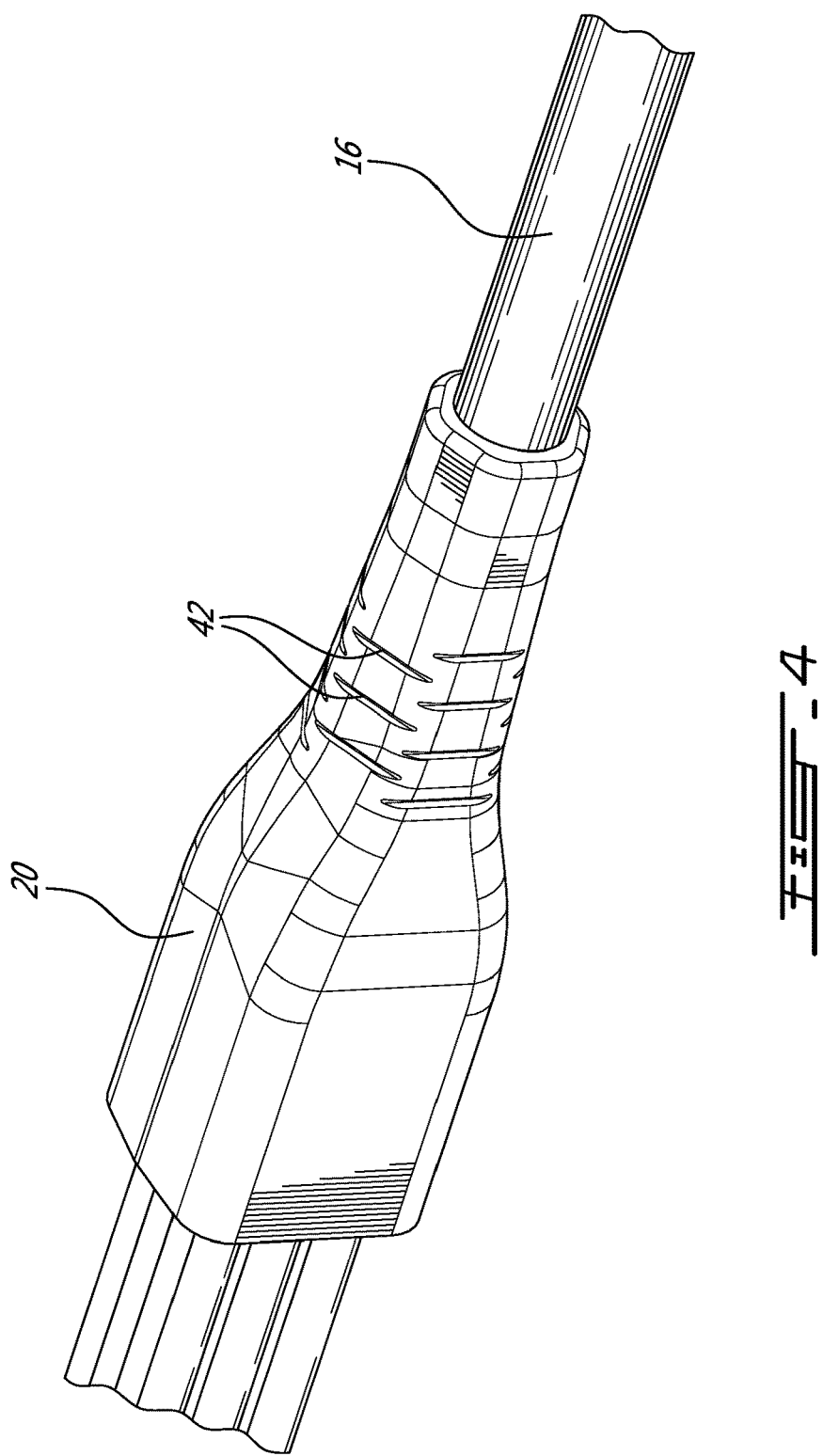

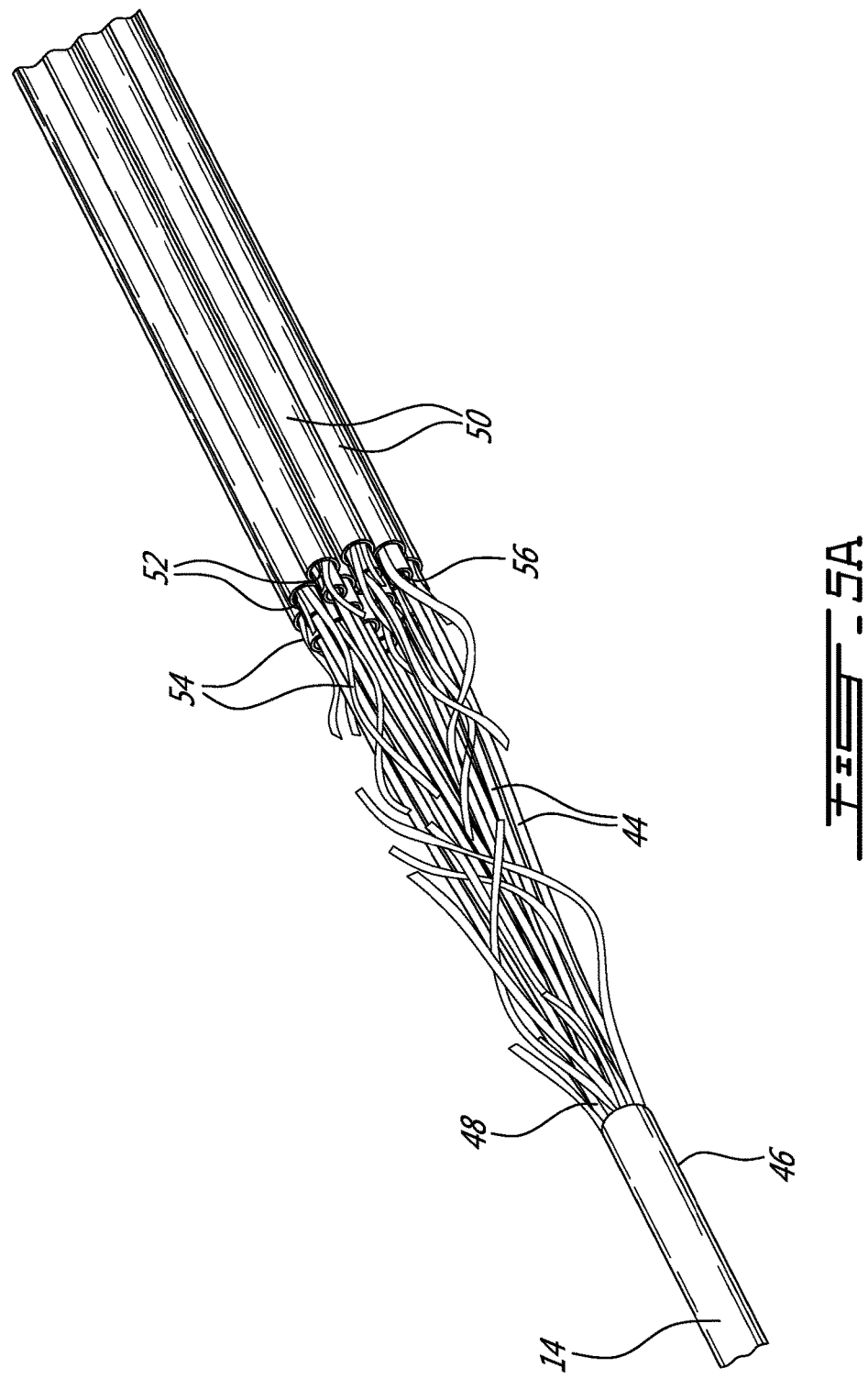

OVERMOULDED FURCATION ASSEMBLY WITH STRAIN RELIEF

CROSS REFERENCE TO RELATED APPLICATIONS

This Application claims priority under 35 USC § 119(e) of U.S. provisional application Ser. No. 62/332,141. All documents above are incorporated herein in their entirely by reference.

FIELD OF THE INVENTION

The present invention relates to an overmoulded assembly with strain relief. In particular, the present invention relates to assemblies and methods for providing robust furcation of optic fibre cables.

BACKGROUND TO THE INVENTION

Multi-fiber optic cables may comprise a plurality of individual optic fiber subunits which must be divided, or furcated, so they can be terminated using an appropriate connector or plug or the like. In higher density optic cables comprising for example 12 subunits each comprising 12 optic fibres bundled together, furcation is done in two steps. One drawback is that furcation typically servers the aramid fibres which provide additional mechanical strength and provide resistance against stretching or the like.

SUMMARY OF THE INVENTION

There is provided an assembly comprising an optic cable comprising a cable jacket having an open end, a plurality of optic fiber subunits each comprising at least one optic fiber encased in a fiber jacket, and a plurality of aramid strands, wherein the fibers and the strands run along a length of the optic cable underneath the cable jacket and exit the open end, at least one block comprising a plurality of passageways aligned with the optic cable length, each passageway receiving at least one of the optic fiber subunits and maintaining adjacent ones of the optic fiber subunits at a predetermined spacing and wherein each of at least one block comprises a first end spaced from and facing the open end, and a housing moulded over the open end of the cable jacket, the aramid strands and the first end of the at least one block.

There is also disclosed a method of overmoulding a transition between an optic fiber cable comprising at least one optic fiber surrounded by first aramid strands and a first outer jacket and a furcation jacketing comprising an optic fiber receiving tube surrounded by second aramid strands and a second outer jacket. The method comprises removing an end portion of the first jacket to expose the at least one optic fiber and the first aramid strands, inserting the at least one optic fiber into a first end of the optic fiber receiving tube and such that a portion of the at least one optic fiber remains exposed between a first jacket end and second jacket end, positioning ends of the first aramid strands and ends of the second aramid strands in a region between the first jacket end and the second jacket end, placing the first jacket end, the second jacket end, the first and second aramid strands and the at least one optic fiber in an elongate mould comprising a plurality of ribs; injecting a molten material into the mould to form an assembly comprising a moulded housing about the first jacket end, the second jacket end, the first and second aramid strands and the at least one optic fiber; and removing the assembly from the mould once solidified. The ribs are arranged at right angles to an axis of the mould and such that the aramid strands are prevented during the injecting from reaching a surface of the mould.

BRIEF DESCRIPTION OF THE DRAWINGS

FIG. 2A provides a partially assembled assembly in accordance with an illustrative embodiment of the present invention;

FIG. 2B provides a detailed view of an overmoulded block and strain relief furcation tubes in accordance with an illustrative embodiment of the present invention;

FIG. 2C provides a detailed view of a partially assembled assembly in accordance with an illustrative embodiment of the present invention;

FIG. 3A provides an unassembled view of an assembly in accordance with an alternative illustrative embodiment of the present invention;

FIG. 3B provides a partially assembled view of an assembly in accordance with an alternative illustrative embodiment of the present invention;

FIG. 3C provides an assembled and overmoulded view of an assembly in accordance with an alternative illustrative embodiment of the present invention; and FIG. 4 provides a top plan view of an overmoulded assembly in accordance with an illustrative embodiment of the present invention; and FIGS. 5A and 5B provide raised perspective views of respectively an unmoulded transition assembly and an overmoulded transition assembly with ribs in accordance with an illustrative embodiment of the present invention.

DETAILED DESCRIPTION OF THE ILLUSTRATIVE EMBODIMENTS

Figure 1:
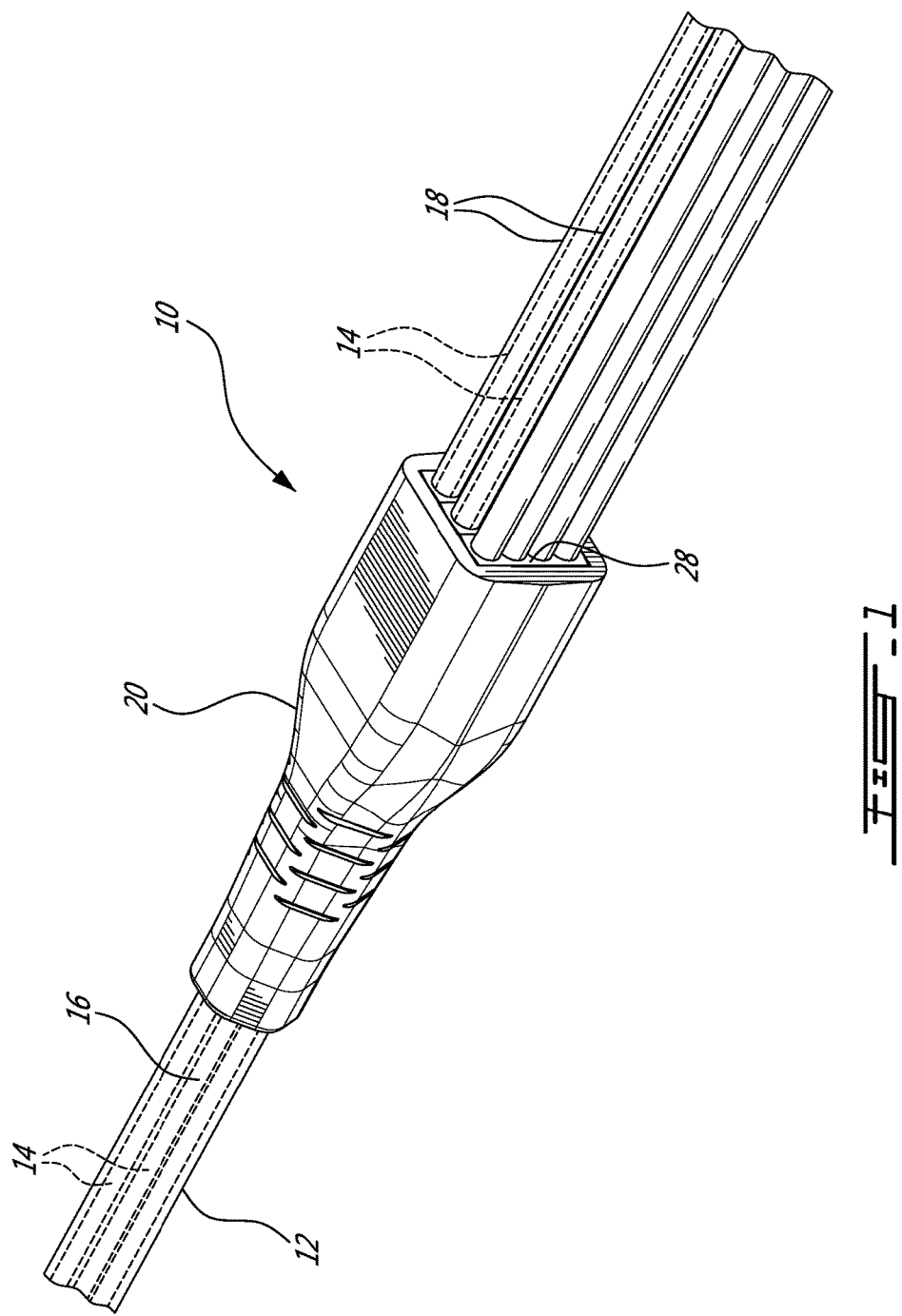
FIG. 1 provides a overmoulded assembly in accordance with an illustrative embodiment of the present invention.

Referring now to FIG. 1, an overmoulded assembly, generally referred to using the reference numeral 10, will now be described. The assembly 10 comprises a fiber optic cable 12 comprising a plurality of individual optic fiber subunits 14 encased in an outer cable jacket 16. Each optic fiber subunit 14, which comprises one or more optic fibers (not shown), is further encased in a respective jacket and is illustratively furcated into a respective furcation tube 18. In a particular embodiment the furcation tube 18 can also provide strain relief. An overmoulded housing 20 is provided about the assembly.

Referring now to FIG. 2A, the cable 12 is first prepared by removing a section of the outer cable jacket 16 and thereby exposing the individual optic fiber subunits 14 and their respective outer cable jackets 16 as well as the aramid strands 22 which are used to provide strength to the cable 12 and such that it can resist stretching effects introduced by pulling of the cable 12 and the like. The aramid strands 22 are illustratively trimmed such that during moulding they do not extend beyond the mould (not shown). The furcated ends of the optic fiber subunits 14 are fed into their respective strain relief furcation tubes 18. In this regard, each strain relief furcation tube 18 is illustratively comprised of a wire coil (not shown) covered with a flexible sealed tube 24, such as a heat shrink tube or the like. Referring to FIG. 2B in addition to FIG. 2A, the strain relief furcation tubes 18 are illustratively first moulded together into subassemblies 26. In this regard, the moulding forms a block 28 about a first end 30 of each of the strain relief furcation tubes 18. The blocks 28 are illustratively keyed, for example comprising a boss 32 on one side and a boss receiving slot 34 on the other and such that adjacent blocks engage one another, thereby improving stability of the assembly during moulding and providing better control of the spacing between adjacent ones of the optic fiber subunits 14.

With reference to FIG. 2C, prior to moulding the subassemblies 26 are arranged side by side and the spacing between the first ends 30 of the strain relief furcation tubes 18 and the end 36 of the outer jacket 16 adjusted by sliding the strain relief furcation tubes 18 as a unit along their respective optic fiber subunits 14 and aramid strands 22.

Referring back to FIG. 1, the assembly is then placed in a mould and overmoulded such that the end 36 of the outer jacket 16, the aramid strands 22, the block(s) 28 and the first ends 30 of the strain relief furcation tubes 18 are interconnected by the overmoulded housing 20.

Referring now to FIG. 3A, in an alternative embodiment, a premoulded collar 38 is provided comprising a plurality of preformed passageways 40 each configured to accept one of the optic fiber subunits 14. In this regard, each passageway 40 is profiled such that adjacent ones of the individual optic fiber subunits 14 are held apart and such that the optic fiber subunits 14 are arranged in, for example, a grid like pattern although in alternative embodiments the pattern could be other than grid-like, for example circular.

Referring to FIG. 3B, the collar 38 is slid over the ends of the plurality of optic fiber subunits 14 until suitably positioned a short distance from the end 36 of the cable jacket 16 and such that trimmed ends of the aramid strands 22 are exposed therebetween, placed in a mould (not shown) and, with reference to FIG. 3C in addition to FIG. 3B, overmoulded such that the overmoulded housing 20 interconnects the end 36 of the cable jacket 16, the aramid strands 22 and the collar 38 are interconnected. Strain relieve furcation tubes 18 can then be placed over one or more of the optic fiber subunits 14 and inserted into a respective passageway 40. In this regard, the passageways 40 and the strain relief furcation tubes 18 may include profiling, such as complementary mating threads or the like, such that the strain relief furcation tubes 18 are held securely within the passageways 40. Alternatively, or additionally, an adhesive may be used to secure the strain relief furcation tube to the collar 38. Alternatively, the strain relief furcation tubes 18 could simply be placed within the passageways 40 without being secured.

Referring now to FIG. 4, in order to ensure that the aramid strands 22 which are exposed through removal of the outer jacket 16 remain centred during moulding and such that they are fully imbedded in the housing 20, the mould comprises ribs (both not shown) which project inwards towards the centre of the mould and such that they introduce spaced indents 42 along the outer surface of the housing 20. The indents 42 serve to limit the travel outward of the aramid strands 22 and such that they are retaining well within the overmoulded housing.

Referring to FIG. 5A, as discussed above each optic fiber subunit 14 comprises typically a plurality of optic fibers 44. In particular embodiment, an end portion of the jacket 46 of the optic fiber subunit 14 is removed such that the optic fibers 44 and aramid strands 48 are exposed. Each optic fiber 44 is terminated in a respective furcation jacketing 50 comprising an outer jacket 52, aramid strands 54 and an inner jacket 56 into which the respective optic fibers 44 are inserted. As known in the art, the furcation jacketing 50 is typically relatively short such that the optic fiber 44 exits the furcation jacketing 50 at an end opposite to the one through which it is inserted where it is terminated together with the furcation jacketing 50, for example by a suitable fiber optic connector (not shown), such as an LC or MU type connector or the like.

Figure 5B:
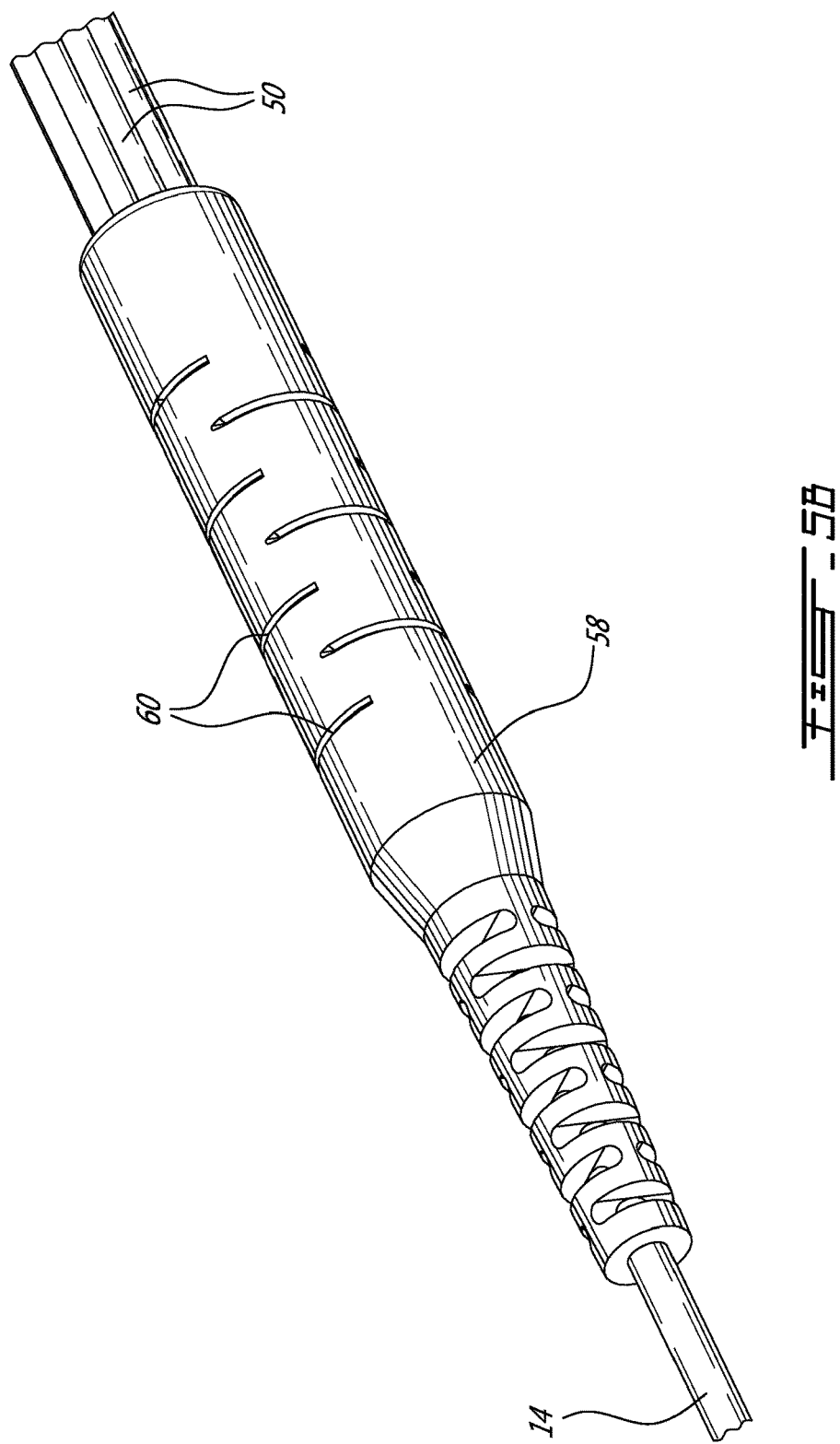

Referring now to FIG. 5B in addition to FIG. 5A, the assembly is subsequently overmoulded with a material to form a housing 58 into which the aramid strands 48, 54 are imbedded, therefore providing a secure and robust transition between the jacket 46 and aramid strands 48 of the optic fiber subunit 14 and the outer jacket 52 and aramid strands 54 of the furcation jacketing 50. In order to ensure that the aramid strands 48, 54 are retained sufficiently away from the surface during a overmoulding within the moulded housing, ribs are provided in the mould (not shown) which leave a series of indents 60 on the outer surface of the housing 58.

Although the present invention has been described hereinabove by way of specific embodiments thereof, it can be modified, without departing from the spirit and nature of the subject invention as defined in the appended claims.

I claim:

1. An overmoulded assembly comprising:
   an optic cable comprising a cable jacket having an open end, a plurality of optic fiber subunits each comprising at least one optic fiber encased in a fiber jacket, and a plurality of aramid strands, wherein said at least one optic fiber and said aramid strands run along a length of said optic cable underneath said cable jacket and exit said open end;
   at least one block comprising a plurality of passageways aligned with said optic cable length, each passageway receiving at least one of said optic fiber subunits and maintaining adjacent ones of said optic fiber subunits at a predetermined spacing and wherein each of said at least one block comprises a first end spaced from and facing said open end; and
   a housing moulded over and in direct contact with said open end of said cable jacket, said aramid strands and said first end of said at least one block.

2. The overmoulded assembly of claim 1, further comprising a plurality of strain relief furcation tubes in contact with a second end of said block opposite said first end and aligned with a respective one of said passageways, and such that each optic fiber exiting said block is received within a respective one of said strain relief furcation tubes.

3. The overmoulded assembly of claim 1, comprising a plurality said passageways and wherein each of said at least one block comprises a like number of said passageways.

4. The overmoulded assembly of claim 1, comprising a plurality of said at least one block and wherein each of said at least one block is keyed such that it engages with adjacent ones of said at least one block.

5. The overmoulded assembly of claim 1, comprising a plurality of said at least one blocks.

6. The overmoulded assembly of claim 5, wherein each of said at least one block comprises four of said passageways.

7. The overmoulded assembly of claim 1, wherein said at least one block comprises a collar, said collar manufactured from a material other than said housing.

8. The overmoulded assembly of claim 1, wherein said housing is elongate and comprises a plurality of ribs moulded therein, each of said ribs arranged at right angles to an axis of said housing.

9. A method of overmoulding a transition between an optic fiber cable comprising at least one optic fiber surrounded by first aramid strands and a first outer jacket and a furcation jacketing comprising an optic fiber receiving tube surrounded by second aramid strands and a second outer jacket, the method comprising:

removing an end portion of the first jacket to expose the at least one optic fiber and the first aramid strands;

inserting the at least one optic fiber into a first end of the optic fiber receiving tube and such that a portion of the at least one optic fiber remains exposed between a first jacket end and second jacket end;

positioning ends of the first aramid strands and ends of the second aramid strands in a region between the first jacket end and the second jacket end;

placing the first jacket end, the second jacket end, the first and second aramid strands and the at least one optic fiber in an elongate mould comprising a plurality of ribs;

injecting a molten material into said mould to form an assembly comprising a moulded housing about the first jacket end, the second jacket end, the first and second aramid strands and the at least one optic fiber; and removing said assembly from said mould once solidified;

wherein said ribs are arranged at right angles to an axis of said mould and such that the aramid strands are prevented during said injecting from reaching a surface of said mould.

* * * * *